United States Patent
Perez Perez et al.

(10) Patent No.: US 8,525,939 B2
(45) Date of Patent: Sep. 3, 2013

(54) VIDEO DISPLAY DEVICE

(75) Inventors: Juan Antonio Perez Perez, Sabadell (ES); Miguel Angel Pedrosa Diaz, Rubi (ES); Josep Manel Ferreiro Gomez, Parets (ES)

(73) Assignee: Sony Corporation, Tokyo (JP)

( * ) Notice: Subject to any disclaimer, the term of this patent is extended or adjusted under 35 U.S.C. 154(b) by 32 days.

(21) Appl. No.: 12/967,672

(22) Filed: Dec. 14, 2010

(65) Prior Publication Data

US 2011/0216251 A1 Sep. 8, 2011

(30) Foreign Application Priority Data

Mar. 3, 2010 (GB) .................................. 1003547.5

(51) Int. Cl.
*H04N 5/64* (2006.01)
(52) U.S. Cl.
USPC .......................................... 348/836; 348/843
(58) Field of Classification Search
None
See application file for complete search history.

(56) References Cited

U.S. PATENT DOCUMENTS

| 7,611,109 B2 * | 11/2009 | Lin ........................... 248/222.52 |
| 2007/0018062 A1 * | 1/2007 | Calinescu ................ 248/220.21 |
| 2009/0101777 A1 * | 4/2009 | Kim ......................... 248/220.21 |

FOREIGN PATENT DOCUMENTS

WO    WO 2009/117792 A2    10/2009
WO    WO 2009/117792 A3    10/2009

OTHER PUBLICATIONS

Great Britian Search Report issued Apr. 29, 2010, in Great Britian 1003547.5, filed Mar. 3, 2010.

* cited by examiner

*Primary Examiner* — Mehrdad Dastouri
*Assistant Examiner* — James Anderson, II
(74) *Attorney, Agent, or Firm* — Oblon, Spivak, McClelland, Maier & Neustadt, L.L.P.

(57) ABSTRACT

A video display device comprising a casing having a front wall and a rear wall. The front wall defines an opening for display screen. The rear wall has formed therein a plurality of clip-receiving portions. The plurality of clip-receiving portions face outwardly of the casing and have a predetermined spacing relative to one another. Each of the plurality of clip receiving portions is configured to receive from outside the casing a respective clip for receiving a fastener for mounting the video display device.

12 Claims, 12 Drawing Sheets

VIDEO DISPLAY DEVICE

CROSS-REFERENCE TO RELATED APPLICATIONS

This application is based upon and claims the benefit of priority from British Application No. 1003547.5 filed 3 Mar. 2010, the entire contents of which are incorporated by reference.

BACKGROUND OF THE INVENTION

1. Field of the Invention

The present invention relates to a video display device, such as a television display, in particular to means and a method by which the display can be mounted, for instance to an architectural structure, such as an architectural wall.

2. Description of the Related Art

It has been known for some time to mount display devices, such as televisions displays, to architectural walls. Fasteners are provided for attaching a mounting bracket to the rear of the display device, for instance protruding through the rear wall of that display device. Indeed standards have been established by the Video Electronics Standards Association (VESA) for the relative spacing and positioning of the fasteners. As a result, standard mounting brackets are available for display devices and display devices are manufactured having fastener-receiving parts at appropriate spacing and positions at the rear of the display device.

Display devices are conventionally manufactured with a casing. The casing may be manufactured as a relatively thin-walled structure merely to house internal components and to provide a pleasing aesthetic appearance. It is undesirable to have to construct the rear wall of the casing in such a manner that it can itself receive fasteners for mounting the display device. Hence, it is usual to provide fastener-receiving parts internally of the casing and merely to provide apertures in the rear wall of the casing allowing access to those fastener-receiving parts.

OBJECTS AND SUMMARY OF THE INVENTION

With the known arrangements as described above, there are increases in costs and complexity during the assembly process, even though only a relatively small number of users will choose to mount the display device. Furthermore, if the fastener-receiving parts within the casing of the display device are missing or become dislodged, there is considerable inconvenience and cost in opening the casing of the display device so as to correctly install a fastener-receiving part.

The present invention aims at least to reduce these problems.

According to the present invention, there is provided a method for mounting a video display device having a casing with a front wall and a rear wall. The method includes forming, in the rear wall of the video display device, a plurality of clip receiving portions facing outwardly of the casing and having a predetermined spacing relative to one another and providing a plurality of clips for receiving respective standard threaded fasteners for mounting the video display device. The clip receiving portions are formed so as to receive, from outside the casing, respective ones of the plurality of clips.

According to the present invention, there is provided a video display device comprising a casing having a front wall and a rear wall. The front wall provides for a display screen. The rear wall has formed therein a plurality of clip-receiving portions. The plurality of clip-receiving portions face outwardly of the casing and have a predetermined spacing relative to one another. Each of the plurality of clip receiving portions is configured to receive, from outside the casing, a respective clip for receiving a standard threaded fastener for mounting the video display device.

In this way, video display devices may be constructed and assembled without any fastener receiving parts. In particular, the display device does not have any means or parts for receiving the standard threaded fasteners for mounting the display device to a mounting bracket. This reduces cost and the complexity of assembly. Because such fastener receiving parts are not provided inside the casing of the video display device, it is not possible for them to become dislodged within the casing. Similarly, there is no need ever to open the casing of the video display device in connection with mounting of that display device onto a mounting bracket. The rear wall itself need not be constructed in such a way as to receive and support mounting bracket fasteners themselves. Instead, the rear wall need merely be constructed, for instance as part of its moulding, to support larger clips which themselves can be constructed so as to support the standard threaded fasteners. The clips can easily be fitted to the clip receiving portions of the rear wall of the casing according to the requirements of the user. For the majority of users who do not use a mounting bracket, such clips need not be fitted.

The relative spacing of the clip receiving portions can be determined according to any known standard or regulation, for instance as provided by VESA.

The clip receiving portions may be arranged to support respective clips so as to move by one of rotation and sliding from a detached position to an attached position.

Thus, a clip may be presented to a respective clip receiving portion in a detached position and then be moved relative to the clip receiving portion so as to become attached to the rear wall.

Clips and respective clip receiving portions may be arranged so as to provide for relative rotation of the clip. In this way, the clip is presented to the respective clip receiving portion in the detached position and then rotated so as to become attached. Alternatively, some or all of the clips and respective clip receiving portions may be arranged such that the clip is presented to the clip receiving portion and then moved linearly in a sliding motion to the attached position.

In this way, it becomes a simple operation for a user to attach the clips to the rear wall of the display device and thereby to reconfigure that display device so as to be ready for mounting to a mounting bracket.

The clip receiving portions may be arranged to support respective clips so that they move substantially parallel to the back wall between their respective detached positions and attached positions. Thus, clips may rotate in a plane generally parallel with the rear wall of the casing or may slide linearly generally parallel to the rear wall of the casing.

Each clip receiving portion may include at least one respective lip defining a space therebehind for receiving at least a part of a respective clip when in the attached position.

Thus, a clip is presented to a respective clip receiving portion in a detached position and then moved (either by rotation or sliding) so that at least part of it moves behind the respective space. In this way, the clip is held from moving away from the rear wall and, thus, takes an attached position.

A clip receiving portion may include a protrusion with the respective clip including a corresponding recess. Alternatively, the clip receiving portion may include a recess and the respective clip may include a corresponding protrusion. The protrusion and recess cooperate with one another as part of a detent mechanism so as to retain the clip in the respective receiving portion.

Where a clip rotates or slides relative to the clip receiving portion, the protrusion and recess may engage with one another as the clip rotates or slides to its attached position. Where the clip receiving portion includes a lip, that lip may include a rearwardly facing protrusion or recess.

The clip receiving portion may be arranged to detachably attach a respective clip to the back wall. In this way, a user may attach clips to the rear wall of the casing so as to allow mounting of the display device to a bracket. However, if the display device is moved and the bracket is no longer required, the clips may be detached (non-destructively) from the respective clip receiving portions. Alternatively, the clip receiving portions may be arranged to non-detachably attach respective clips to the rear wall. In this case, having attached the clips to the rear wall of the casing, it will not be possible to remove the clips without breaking one or both of the clips and the clip receiving portions. However, in practice, this may not cause any difficulty to the user on the basis that the clips are provided at the rear of the display device and need not be unduly large.

At least two of the clip receiving portions may be arranged to support respective clips for movement from respective detached positions to respective attached positions in different respective directions.

This is particularly advantageous where the clip receiving portions are arranged to allow clips to slide from their detached positions to their attached positions. By arranging the clips to slide in two different perpendicular and/or opposite directions, once the clips are attached to a mounting bracket by means of fasteners, then the fasteners in the mounting bracket will prevent the clips from moving relative to one another such that the clips cannot all move simultaneously in the same direction to their detached positions.

For rotatably movable clips, the clips can be rotatable in opposite directions.

It will be appreciated that the plurality of clip receiving portions could include a mixture of clip receiving portions intended for rotation and clip receiving portions intended for linear motion.

The video display device may be provided to a user with one or more clips for use with the clip receiving portions.

The clip may include a fastener receiving part for receiving a standard threaded-fastener therein to mount the video display device.

It is possible for the clip to be constructed from a material appropriate for receiving and supporting the standard threaded fastener. Similarly, it may be constructed with appropriate dimensions for the standard threaded fastener. Standard fasteners may be defined in appropriate standards or regulations, for instance as specified by VESA and, hence, the fastener receiving part may be configured to receive a standard threaded fastener.

The threaded-fastener receiving part may define a bore for receiving a threaded-fastener. When the at least one clip is received in the respective one of the plurality of clip receiving portions, the bore may extend substantially perpendicular to the back wall and inwardly of the casing. In this respect, the rear wall of the casing may be provided with a recess or through hole into which the fastener receiving part extends.

Where the clip is rotatable, the clip receiving portion may define a recess or through-hole, optionally circular in shape, within which the fastener receiving part can rotate. Where the clip receiving portion allows linear sliding of the clip, the clip receiving portion may define a recess or through-hole which is elongate so as to allow the fastener receiving part to slide with sliding of the clip.

BRIEF DESCRIPTION OF THE DRAWINGS

FIGS. 1(*a*) and (*b*) illustrate schematically a video display device embodying the present invention;

FIGS. 3(*a*) to (*d*) illustrate a clip receiving portion according to one embodiment of the present invention;

FIGS. 5(*a*) to (*d*) illustrate a clip receiving portion according to another embodiment of the present invention.

DETAILED DESCRIPTION OF THE PREFERRED EMBODIMENTS

The invention will be more clearly understood from the following description, given by way of example only, with reference to the accompanying drawings.

The present invention is applicable to any known video display device, including traditional cathode ray tube devices and also flat-panel devices, such as LCD devices. It is particularly useful for devices such as television display devices and allows those devices to be attached to a mounting bracket, for instance for mounting on an architectural structure, such as a vertical wall.

Figure 1A:
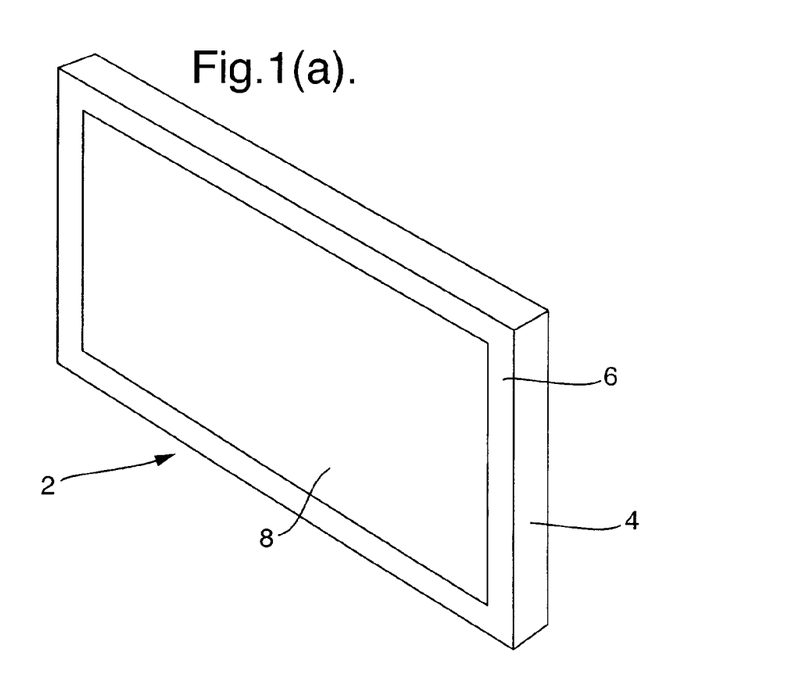
Figure 1B:
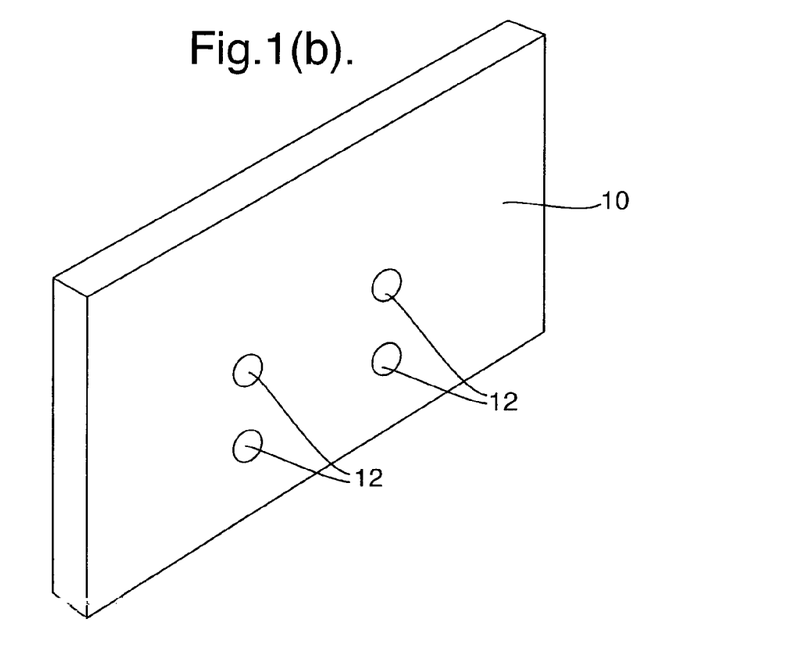

FIGS. 1(*a*) and (*b*) illustrate schematically the front and rear of a display device embodying the present invention.

The display device 2 includes a casing 4 for housing internal components therein. The casing 4 includes a front wall 6 at which a display screen 8 is provided. The front wall 6 may, as illustrated, define an opening in which the display screen 8 is provided. However, it is also possible that the front wall of the casing supports a screen which itself forms substantially the entire front surface of the display device.

At the rear of the device 2, the casing 4 includes a rear wall 10.

Although it is known to provide at the rear of a display device means for receiving fasteners for a mounting bracket, the display device 2 illustrated in FIG. 1(*b*) instead includes a plurality of clip receiving portions 12 formed in the rear wall 10 of the casing 4.

Figure 2:
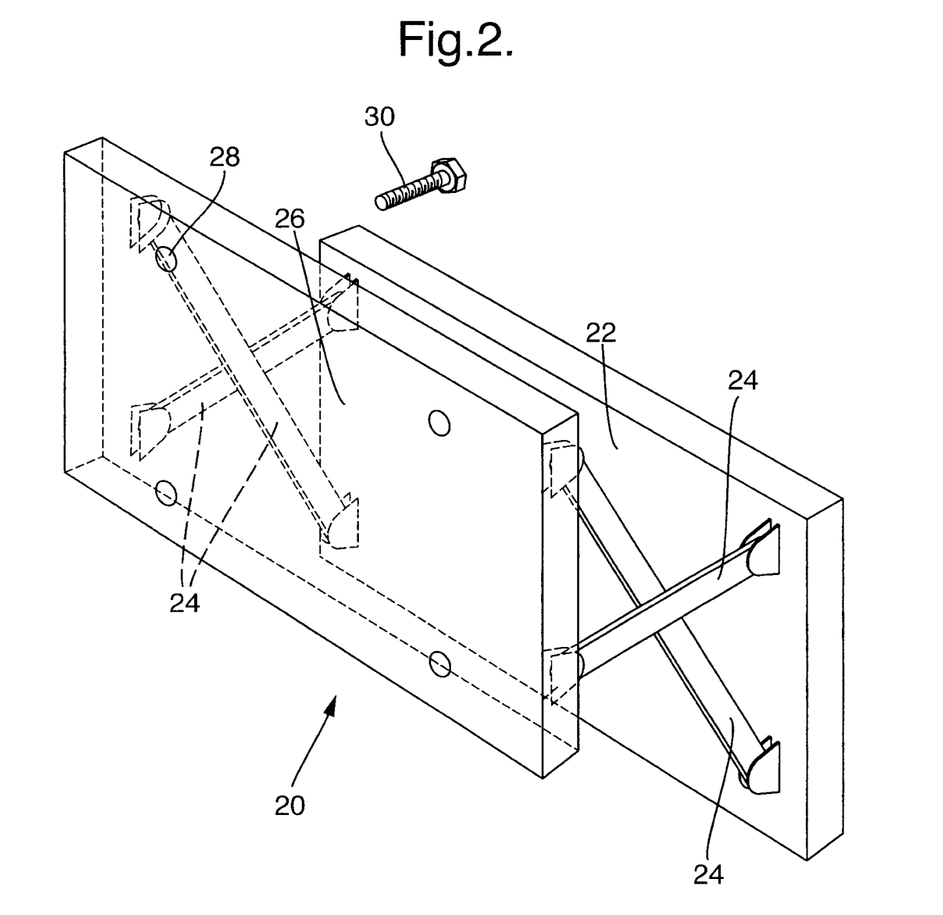
FIG. 2 illustrates a mounting bracket for use with the video display device.

FIG. 2 illustrates schematically a mounting bracket for mounting video display devices in general and capable also of mounting a video display device as illustrated in FIGS. 1(*a*) and (*b*).

The mounting bracket 20 includes a base plate 22 for attachment in any known manner to an architectural structure such as a vertical wall. The base plate 22 is arranged to support a mounting plate 26 by means of arms 24. The mounting plate 26 is intended for mounting to the rear wall of a video display device. It defines a plurality of mounting holes 28, each intended to receive a respective standard threaded fastener 30 for attaching the mounting plate 26 to a display device.

An example of one arrangement of a clip receiving portion and respective clip will now be described with reference to FIGS. 3(*a*) to (*d*) and also to FIG. 4.

FIG. 3(*a*) illustrates a clip receiving portion 40 formed in the rear wall of the casing of a display device in conjunction with a respective clip 50. In this embodiment, the clip 50 attaches to the clip receiving portion 40 and, hence, the rear wall, by rotating from a detached position to an attached position.

Figure 3A:
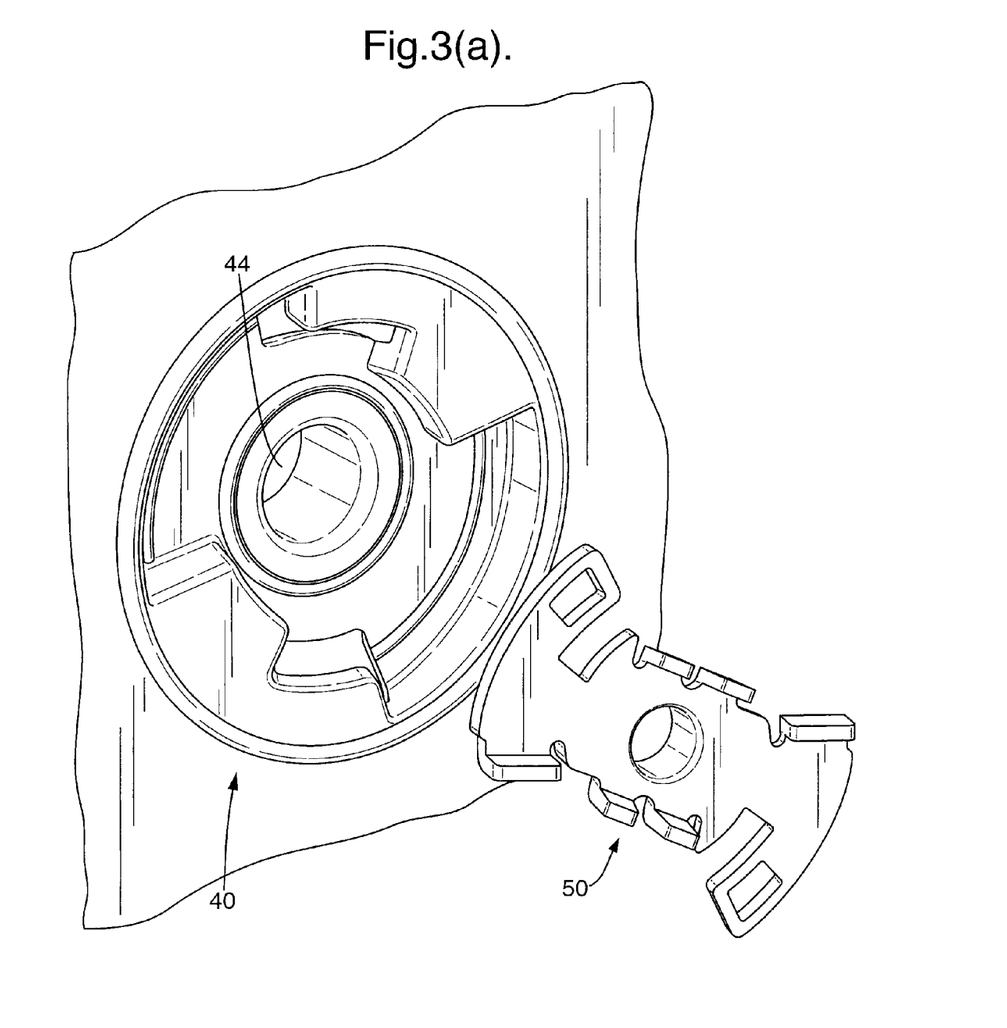
Figure 3B:
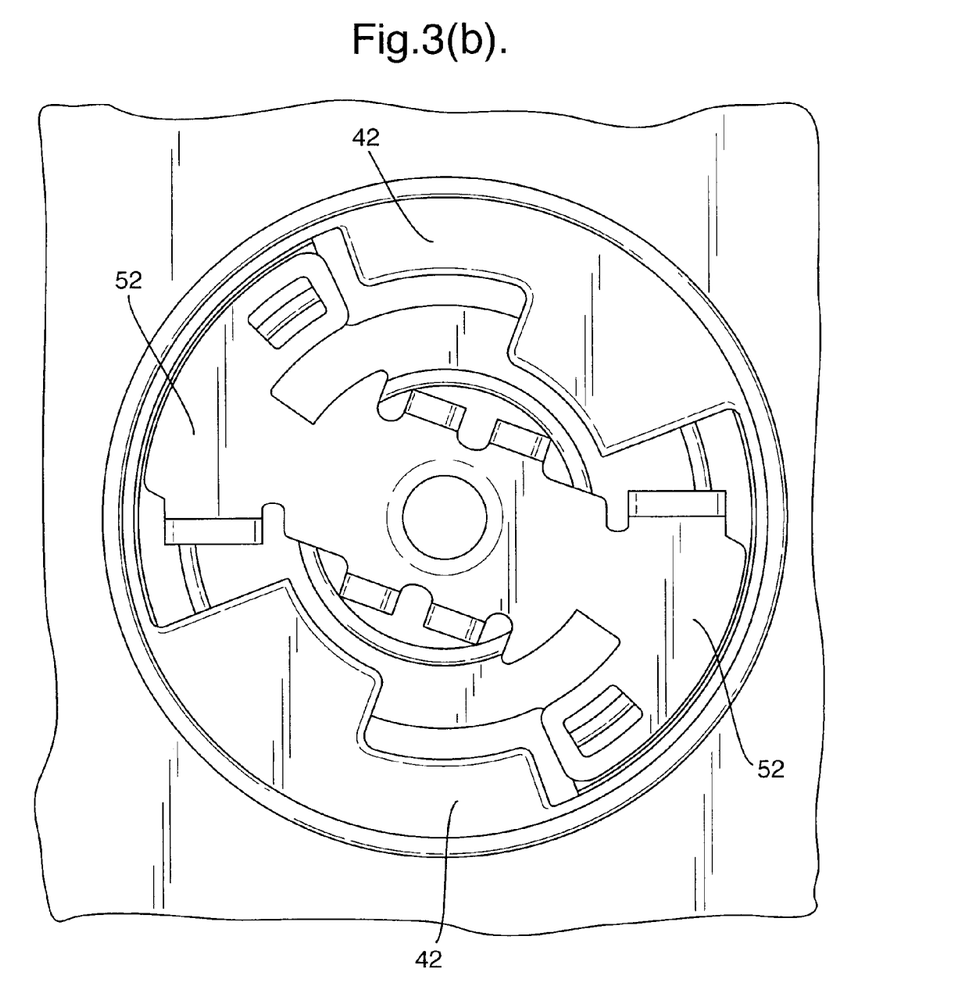
Figure 3C:
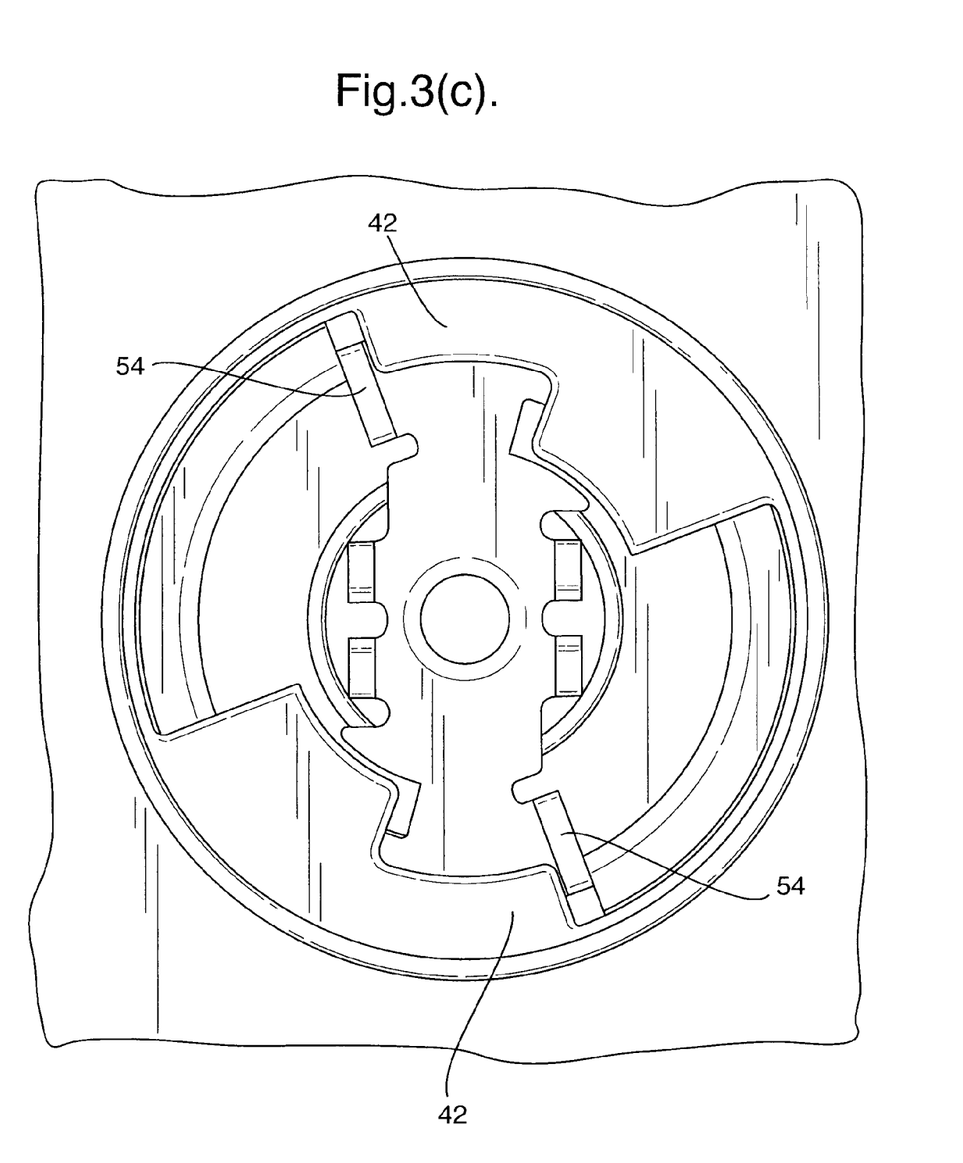

In FIG. 3(b), the clip 50 is received by the clip receiving portion 40 and is in the detached position. By rotating the clip 50 clockwise with respect to the clip receiving portion 40, attachment parts 52 at radial ends of the clip 50 are rotated underneath respective lips 42 of the clip receiving portion 40. The lips 42 define respective spaces inwardly towards the casing. With the attachment parts 52 behind the lips 42 and in the defined spaces as illustrated in FIG. 3(c), the clip 50 is in its attached position and is held securely in the clip receiving portion 40 and attached to the rear wall of the casing.

Figure 4:
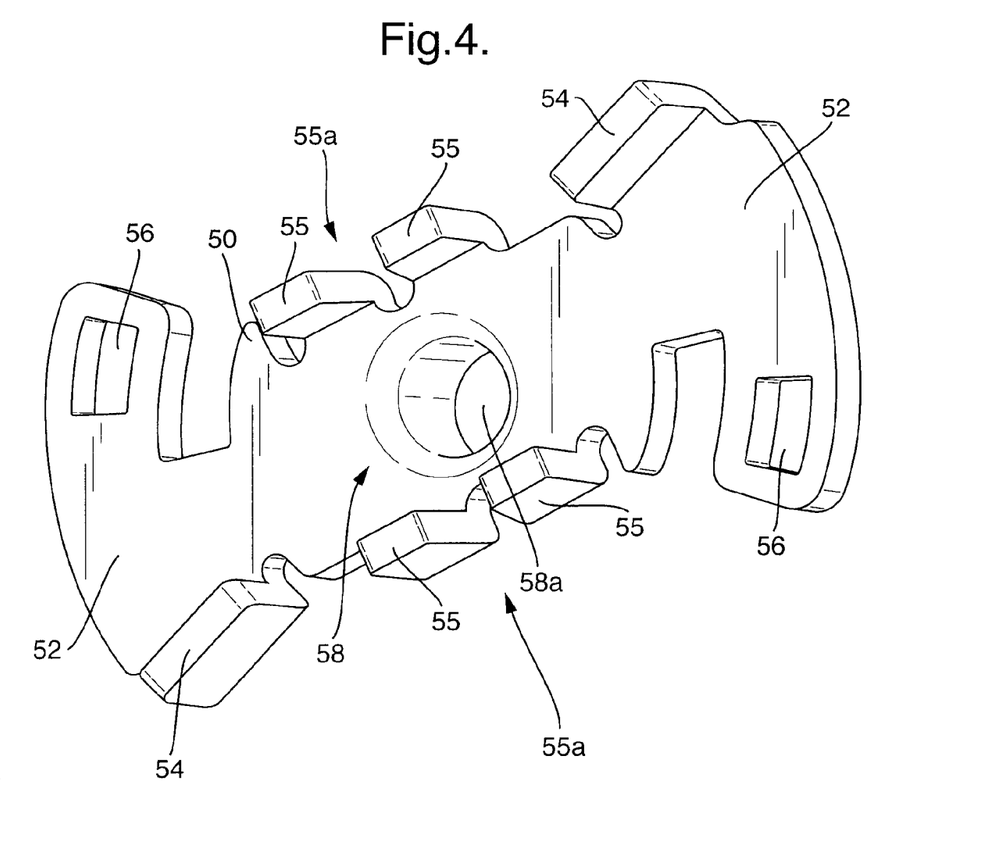
FIG. 4 illustrates a clip for use with the clip receiving portion of FIGS. 3(*a*) to (*c*)

The clip 50 is also illustrated in FIG. 4. Here it can be seen that radially extending flanges 54 which protrude in an axial direction act as stops 54 for rotation of the clip 50 relative to the clip receiving portion 40. In particular, as illustrated in FIG. 3(c), the stops 54 abut ends of the lips 42 in a circumferential direction when the clip 50 is rotated into its attached position.

The clip 50 illustrated in FIG. 4 is also provided with radial extending flanges 55 which extend in an axial direction and define substantially diametrically opposed slots 55a. In particular, the flanges 55 take the form of four lugs towards the centre of the clip 50. The lugs and the diametrically opposed slots 55a are arranged to receive the head of a screw driver or other similar generally flat tool, thereby enabling a user to rotate the clip 50 from its detached position to its attached position.

Other alternative features could be provided on the clip 50 to facilitate its rotation, for instance by means of an Allen key.

In the illustrated embodiment, the attachment parts 52 of the clip 50 are provided with outwardly facing recesses 56 which, in the illustrated embodiment, happen to take the form of through holes. As illustrated, in FIG. 3(d) the lips 42 of the clip receiving portion 40 may be provided with corresponding rearwardly facing protrusions 42a which are arranged to engage with the recesses 56 as part of a detent mechanism. In particular, when the clip 50 is rotated from its detached position illustrated in FIG. 3(b) to its attached position as illustrated in FIGS. 3(c) and (d), the attachment parts and respective lips 42 flex away from one another so as to allow the rearwardly facing protrusions 42a of the lips 42 to move towards and then engage in the respective recesses 56 when the clip 50 reaches its attached position. In this way, the clip 50 is held securely in the attached position.

It will be noted that the illustrated example shows a rear wall and clip receiving portion which could have been produced as a single mould. To enable this moulding process without the use of insert moulding etc, the space defined behind the lips 42 is actually formed as a through hole in the rear wall.

As illustrated, the clip 50 is provided at its centre with a fastener receiving part 58 for receiving a fastener such as fastener 30 described with reference to FIG. 2. The fastener receiving part 58 is constructed with dimensions suitable for supporting such a fastener and the clip can be constructed from a material appropriate for supporting such a fastener.

As illustrated, the fastener receiving part 58 defines a bore 58a into which a fastener may extend or be threaded.

In this illustrated embodiment, the clip receiving portion 40 includes a corresponding recess 44 which, in the illustrated embodiment takes the form of a through hole. The recess 44 may extend into the casing so as to allow the fastener receiving part 58 similarly to extend into the casing.

For this embodiment, where the clip 50 is rotatable relative to the clip receiving portion 40, the recess 44 is provided as a circular cross section which matches a circular outer cross section of the fastener receiving part 58 of the clip 50. This is advantageous in providing additional support for the clip 50 whilst allowing its rotation relative to the clip receiving portion 40. It will be appreciated that the clip 50 moves generally parallel to the plane of the rear wall. The recess 44 is useful in helping to locate accurately the position of the clip 50 in the rear wall, whilst allowing its rotation between its detached and attached positions.

Figure 3D:
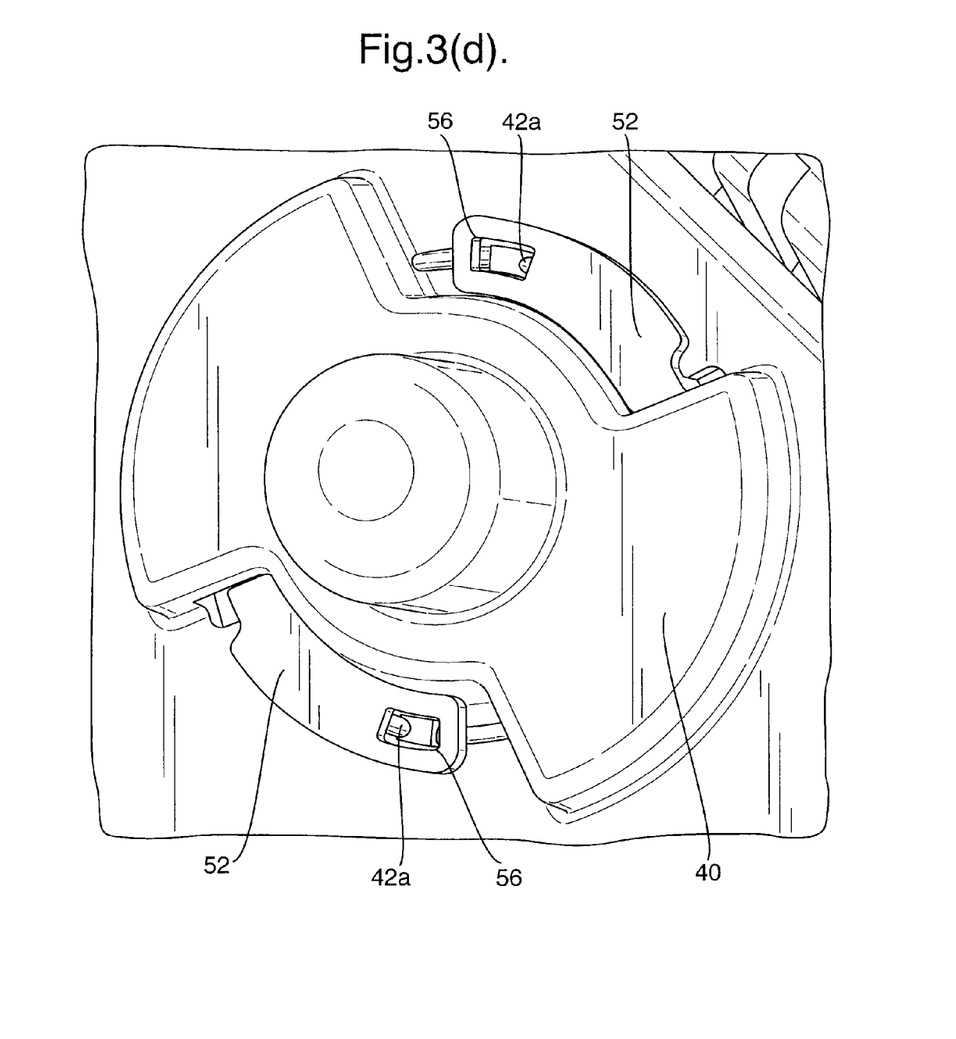

With this illustrated embodiment, the relative shapes of the recess 56 in the attachment part 52 of the clip 50 and the protrusion behind the lip 42 can be chosen so as to determine whether the clip 50 can be moved from its attached position to its detached position or whether the clip, once in its attached position cannot be non-destructively removed. For instance, a saw-tooth profile to the protrusion may prevent removal.

It will be appreciated that embodiments are also possible with a protrusion provided on the attachment part 52 of the clip 50 and a recess provided in the lip 42.

FIGS. 5(a) to (d) illustrate an alternative clip and clip receiving portion. In particular, with this alternative arrangement, the clip and clip receiving portion are arranged to move linearly in a sliding motion relative to one another. The clip receiving portion 60 is formed in the rear wall of the casing of a display device and is provided in conjunction with a respective clip 70. The clip 70 attaches to the clip receiving portion 60 and, hence, the rear wall, by sliding (upwardly as illustrated) from a detached position to an attached position.

Figure 5A:
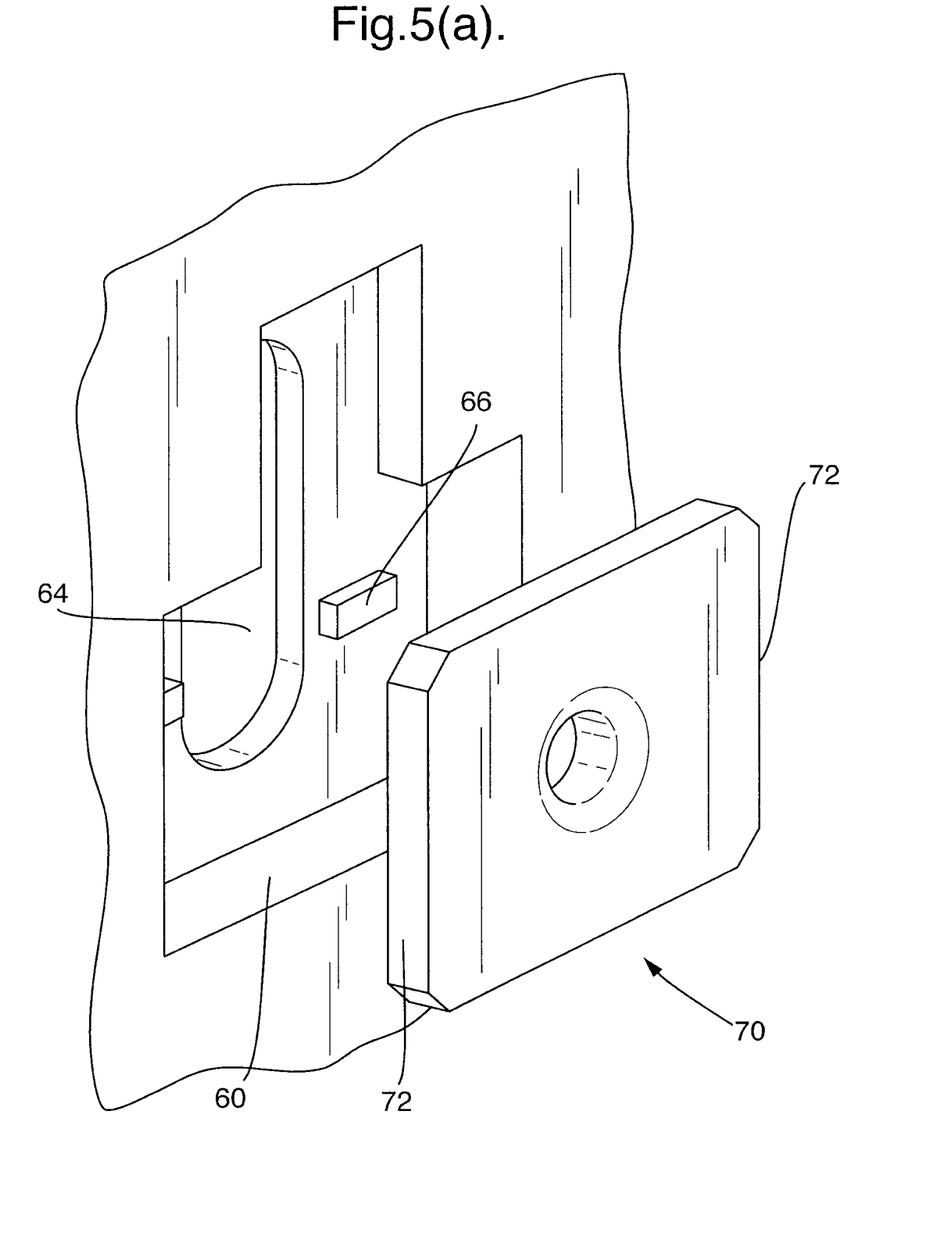
Figure 5B:
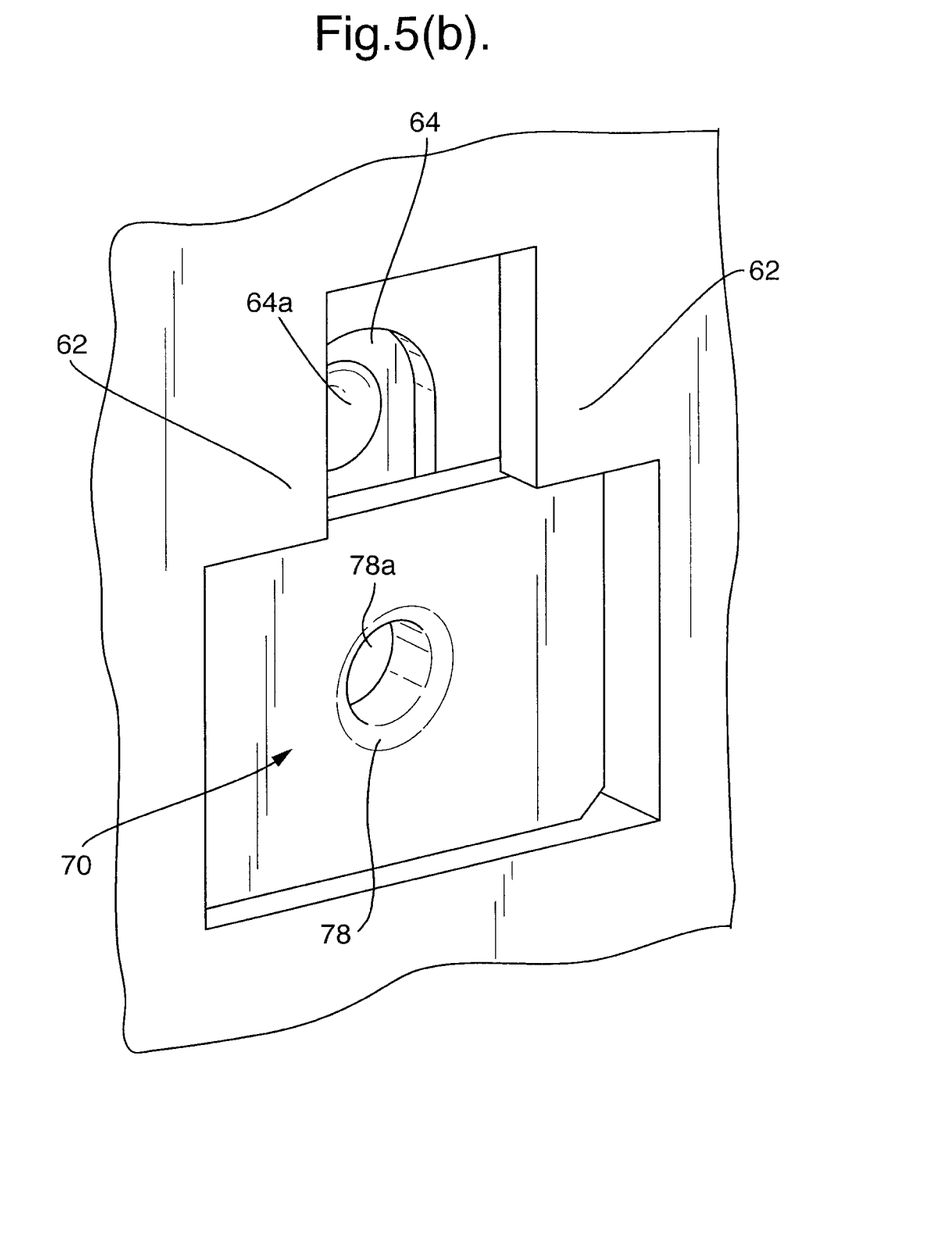
Figure 5C:
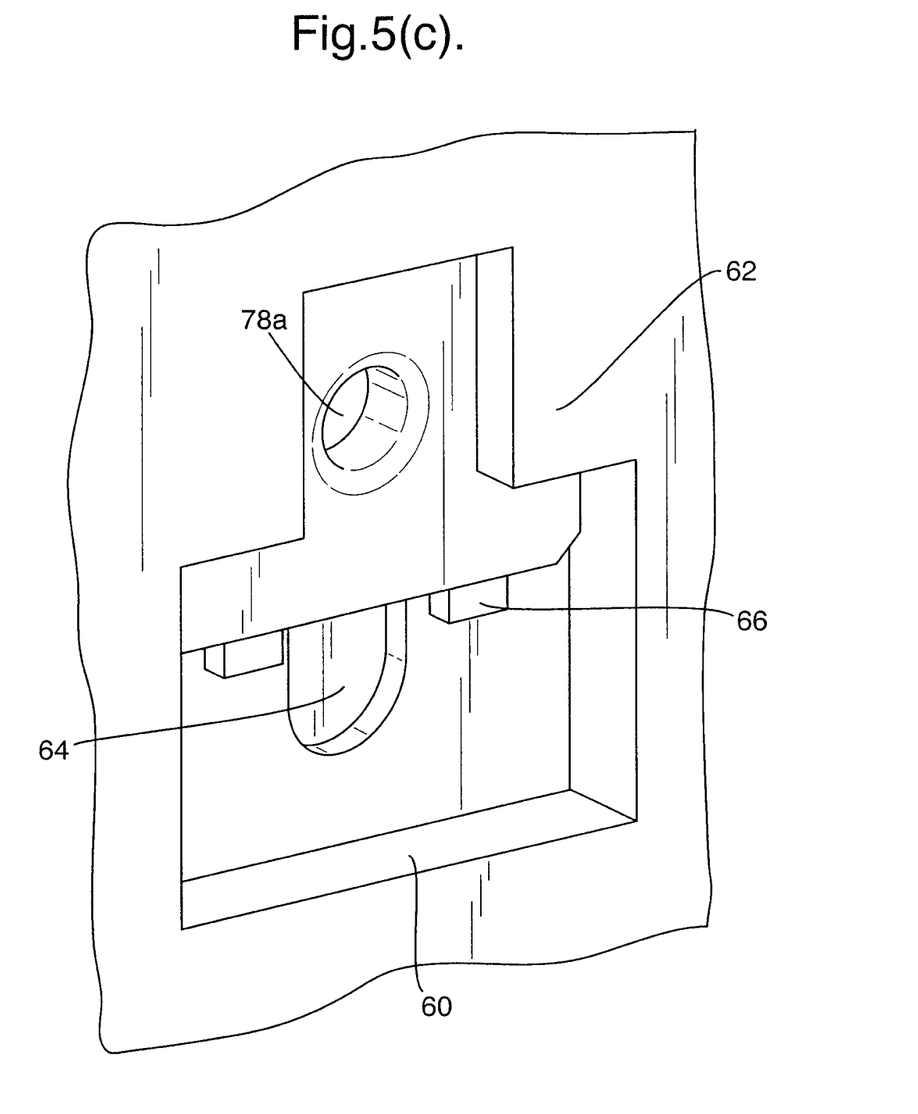

In FIG. 5(b), the clip 70 is received by the clip receiving portion 60 and is in a detached position. By sliding the clip 70 (upwards as illustrated) with respect to the clip receiving portion 60, opposite lateral sides forming attachment part 72 slide underneath respective lips 62 of the clip receiving portion 60. The lips 62 define respective spaces towards the inside of the casing. With the attachment parts 72 behind the lip 62 and in the defined spaces as illustrated in FIG. 5(c), the clip 70 is in its attached position and is held securely in the clip receiving portion 60 and attached to the rear wall of the casing.

As illustrated, the clip 70 is provided at its centre with a fastener receiving part 78 for receiving a fastener such as fastener 30 described with reference to FIG. 2. The fastener receiving part 78 is constructed with dimensions suitable for supporting such a fastener and the clip 70 can be constructed from a material appropriate for supporting such a fastener.

As illustrated, the fastener receiving part 78 defines a bore 78a into which a fastener may extend or be threaded.

In this illustrated embodiment, the clip receiving portion 60 includes a corresponding recess 64. The recess 64 extends into the casing so as to allow the fastener receiving part 78 similarly to extend into the casing.

In the illustrated embodiment, the recess 64 is elongate in the direction of sliding of the clip 70. Thus, when the clip 70 is in the detached position illustrated in FIG. 5(b), the fastener receiving part 78 of the clip 70 is positioned within one end of the recess 64. As the clip 70 slides along towards the attached position, the fastener receiving part 78 similarly slides along the recess 64.

In the illustrated embodiment, at the far end of the recess 64, there is defined a further recess 64a which, in this embodiment, takes the form of a through hole. The further recess 64a is provided so as to align with the bore 78 of the clip 70 when the clip 70 is in the attached position. It allows a fastener to protrude beyond the fastener receiving part 78 and into the casing.

In order to facilitate mounting of the clip 70 to the clip receiving portion 60, the clip receiving portion 60 may be provided with parallel sides extending in the direction in which the clip 70 moves for attachment. Similarly, the clip 70 has parallel sides with a corresponding spacing. In this way, the clip 70 is held securely in place but is able to slide along the clip receiving portion 60.

As illustrated, the clip 70 has of a right angled quadrilateral shape. However, it is possible for its longitudinal ends to take forms other than straight lines.

As with the rotational embodiment described above, it is possible for one of the clip and the clip receiving portion to be provided with a protrusion and the other of the clip and the clip receiving portion to be provided with a recess. The protrusion and recess operate as a detent mechanism to secure the clip 70 in its attached position.

In the embodiment illustrated in FIGS. 5(*a*) to (*c*), protrusions 66 are provided on a rear face of the clip receiving portion 60 facing outwardly from the casing. The protrusions may be dimensioned so as to press against an underside of the clip 70 whilst it is moved from the detached position of FIG. 5(*b*) to the attached position of FIG. 5(*c*). The resilience of the clip 70 itself and/or the resilience of the lips 62 of the clip receiving portion 60 may contribute in providing this pressure. Once the clip 70 reaches its attached position as illustrated in FIG. 5(*c*), the protrusions 66 act to abut upon a longitudinal end (the lower end as illustrated) of the clip 70 so as to hold the clip 70 in its attached position.

Figure 5D:
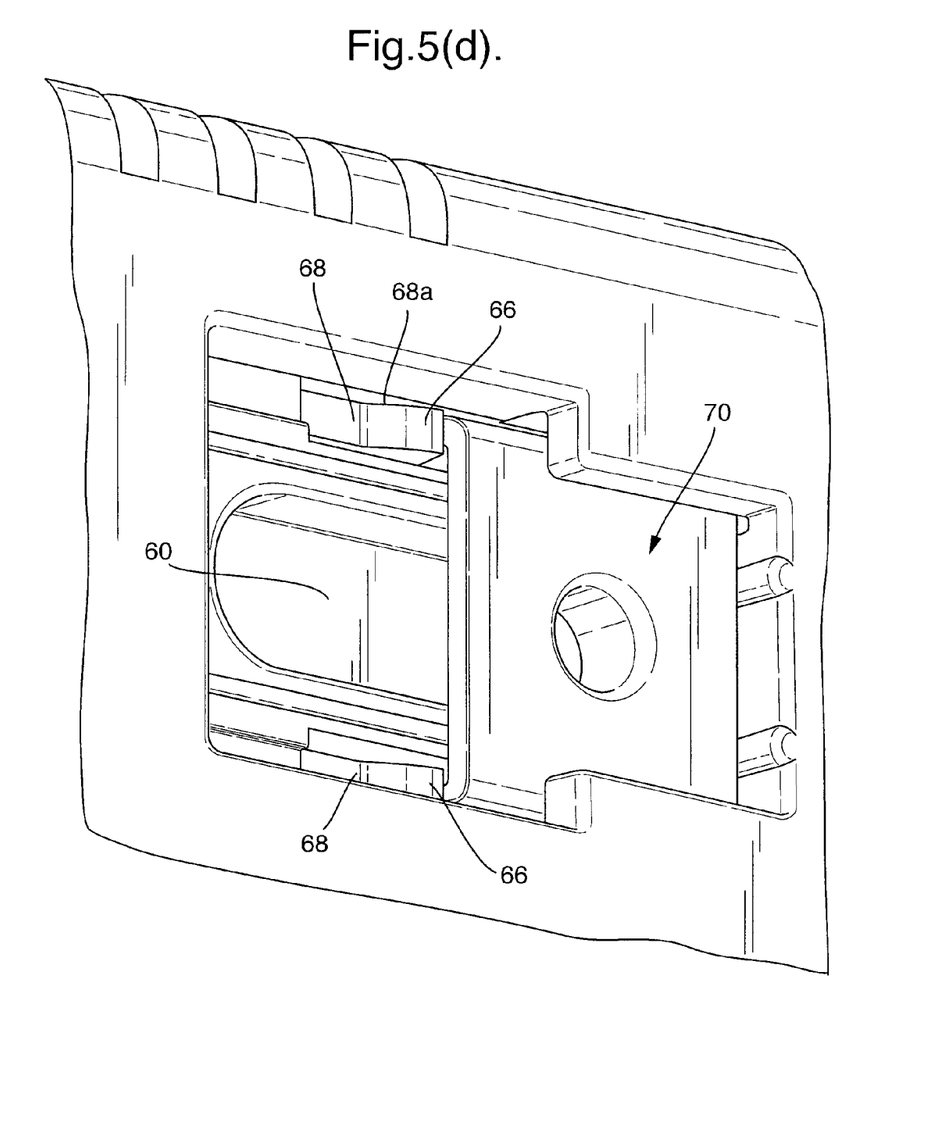

According to a slight variation of the embodiment described above, as illustrated in FIG. 5(*d*), the protrusions 66 can be provided on the ends of respective arms 68. As illustrated, the arms 68 extend within corresponding recesses 62*a* formed in the clip receiving portion 60. In the illustrated embodiment, the recesses 68*a* take the form of through holes in the casing wall. The arms 68 extend from (and may be integral with) the rear wall and have some resilience allowing them to flex. As the clip 70 is moved slidably from its detached position, the underside of the clip 70 deflects the protrusion 66 and corresponding arms 68 inwardly of the casing. Once the clip 70 is in the attached position as illustrated in FIG. 5(*d*), the protrusions 66 on their respective arms 68 return to an at-rest position in which the protrusions 66 prevent the clip 70 sliding away from its attached position. It would then be possible for a user to deflect the arms 68 inwardly of the casing so as to enable the clip 70 to be moved from its attached position to its detached position.

Figure 6:
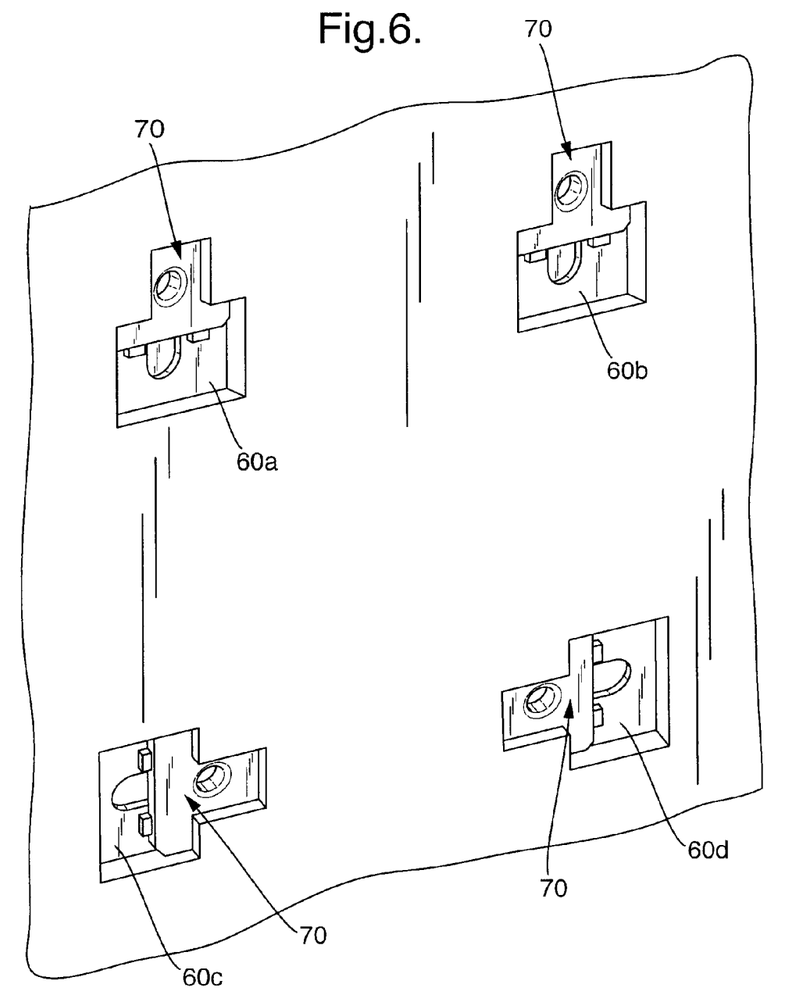
FIG. 6 illustrates an array of the clip receiving portions of FIGS. 5(*a*) to (*c*).

FIG. 6 illustrates an advantageous arrangement of four clip receiving portions 60 and clips 70 in the rear wall of a casing of a display device.

As illustrated, the clip receiving portions 60 have a number of different orientations for sliding of their respective clips 70 between detached and attached positions.

Clip receiving portions 60*a* and 60*b* are orientated such that their respective clips are moved upwards to attached positions. In contrast, clip receiving portion 60*c* is orientated such that its clip moves rightwards towards an attached position and clip receiving portion 60*d* is orientated such that its clip moves leftwards to an attached position.

By providing the clip receiving portions 60 with at least two different orientations, when the clips are attached to a mounting bracket by means of fasteners, they have a fixed relative spacing and the mounting bracket prevents the clips moving back to their detached positions.

It will be appreciated that an array of clip receiving portions may be provided including different types of clip receiving portion, for instance including both slidable and rotatable arrangements.

It will be appreciated that clips can be provided which can be attached (and detached) from their respective clip receiving portions using fingers or simple tools such as screw drivers or Allen keys. Whilst sliding clips might be operated by hand, rotating clips might be operated with a screw driver.

We claim:

1. A video display device comprising:
   a casing having a front wall and a rear wall; wherein
   the front wall provides for a display screen;
   the rear wall has formed therein a plurality of clip-receiving portions so that the clip-receiving portions are integral parts of the rear wall;
   the plurality of clip-receiving portions face outwardly of the casing and have a predetermined spacing relative to one another; and
   each of the plurality of clip-receiving portions is configured to receive from outside the casing a respective clip without each of the plurality of clip-receiving portions being fastened to any threaded fastener, so that only the respective clip includes a threaded-fastener receiving part to receive a threaded fastener from outside the casing to mount the video display device.

2. A video display device according to claim 1 wherein:
   the clip-receiving portions are arranged to support respective clips so as to move by one of rotation and sliding from a detached position to an attached position.

3. A video display device according to claim 2 wherein:
   the clip-receiving portions are arranged to support respective clips to move substantially parallel to the rear wall between the detached position and the attached position.

4. A video display device according to claim 2 wherein:
   each clip-receiving portion includes at least one respective lip defining a space therebehind that receives at least a part of a respective clip when in the attached position.

5. A video display device according to claim 1 wherein:
   each clip-receiving portion includes one of a protrusion and a recess that cooperates with the other one of a protrusion and a recess on a respective clip as part of a detent mechanism to retain a respective clip in the respective clip-receiving portion.

6. A video display device according to claim 1 wherein:
   the clip-receiving portions are arranged to detachably attach or non-detachably attach respective clips to the rear wall.

7. A video display device according to claim 1 wherein:
   the rear wall defines, for each clip-receiving portion, a respective recess that receives therein the threaded-fastener receiving part of a respective clip; and
   each respective recess is arranged so that a receiving part of a respective clip is movable from a detached position to an attached position in the respective recess.

8. A video display device according to claim 1 wherein:
   at least two of the clip-receiving portions are arranged to support respective clips so that the respective clips are movable from respective detached positions to respective attached positions in different respective directions.

9. A video display device according to claim 1 further comprising:
   at least one of the clips to be presented to a respective one of the plurality of clip-receiving portions from outside the casing and arranged to be received by the respective one of the plurality of clip-receiving portions.

10. A video display device according to claim 9 wherein:
    the threaded-fastener receiving part defines a bore that receives a threaded fastener; and
    when the at least one clip is received in the respective one of the plurality of clip-receiving portions, the bore extends substantially perpendicular to the rear wall and inwardly of the casing.

11. A method for mounting a video display device having a casing with a front wall and a rear wall, the method including:
   forming, in the rear wall of the video display device, a plurality of clip-receiving portions facing outwardly of the casing and having a predetermined spacing relative to one another, so that the clip-receiving portions are integral parts of the rear wall; and
   providing a plurality of clips, so that only the clips each include a threaded-fastener receiving part to receive a respective threaded fastener from outside the casing to mount the video display device; wherein
   the clip-receiving portions are formed so as to receive, from outside the casing, respective ones of the plurality of clips without each of the plurality of clip-receiving portions being fastened to any threaded fastener.

12. A video display assembly comprising:
   a video display device including a casing having a front wall and a rear wall, wherein the front wall provides for a display screen, the rear wall has formed therein a plurality of clip-receiving portions so that the clip-receiving portions are integral parts of the rear wall, and the plurality of clip-receiving portions face outwardly of the casing and have a predetermined spacing relative to one another;
   respective clips to be presented to the plurality of clip-receiving portions from outside the casing and arranged to be received by respective ones of the clip-receiving portions, each of the plurality of clip-receiving portions being configured to receive from outside the casing a respective one of the clips without each of the plurality of clip-receiving portions being fastened to any threaded fastener, so that only the clips each include a threaded-fastener receiving part to receive a respective threaded fastener to mount the video display; and
   a mounting bracket including mounting holes that receive the respective threaded fasteners to be received by respective ones of said clips.

\* \* \* \* \*